INVENTORS
PIET HOEKSTRA
JAN B.R.TEISMAN
BY
AGENT

INVENTORS
PIET HOEKSTRA
JAN B.R.TEISMAN
BY
Frank R. Trifari
AGENT

INVENTORS
PIET HOEKSTRA
JAN B.R.TEISMAN
BY
Frank R. Trifari
AGENT

INVENTORS
PIET HOEKSTRA
JAN B.R.TEISMAN
BY
Frank R Jeffer
AGENT

United States Patent Office 3,443,154
Patented May 6, 1969

3,443,154

CONTROL CIRCUIT FOR FLASHING AN ARC DISCHARGE LAMP

Piet Hoekstra and Jan Bernardus Reint Teisman, Emmasingel, Eindhoven, Netherlands, assignors, by mesne assignments, to U.S. Philips Corporation, New York, N.Y., a corporation of Delaware Filed Sept. 20, 1965, Ser. No. 488,505
Claims priority, application Netherlands, Sept. 22, 1964, 6411006
Int. Cl. H05b *41/14, 37/00*
U.S. Cl. 315—240 13 Claims The present invention relates to a film projector comprising a high pressure gas or vapour filled lamp which is supplied with voltage pulses by means of a controlled pulse rectifier in order to obtain light flashes.

There is known a film projector of this kind which comprises a pulse circuit supplied from a three-phase rectifying arrangement which comprises an expensive, supply transformer of relatively large size, six rectifying elements coupled therewith and a comparatively expensive power control. The output voltage of this supply source exhibits a ripple so that the pulse capacitor is not always charged to the same value. Therefore, the pulses are relatively different and during the projection a slight troublesome flickering is produced.

The invention is characterized in that the film projector is provided with two pulse circuits each having a pulse capacitor and a controlled pulse rectifier, said pulse circuits furnishing identical pulses having a relative phase shift of 180°. Each pulse circuit is connected to one phase of a two-phase rectifying circuit connected to a supply transformer.

The invention has for its object to avoid the aforesaid disadvantages. The pulse capacitors are invariably charged to the same value so that pulses of identical magnitude are produced.

A further advantage of the invention is that the supply circuit is considerably simpler.

Moreover, in accordance with the invention, double the number of pulses or light flashes is obtained by employing two controlled pulse rectifiers.

With the aforesaid known film projector the control signal of the pulse rectifier is derived from a generator coupled with the Maltese cross so that with a frequency of 72 c./s. and a frame frequency of 24 images per second, three flashes are produced for each frame.

On the basis of a supply frequency of 50 c./s., one hundred flashes per second are produced in the arrangement according to the invention, and with a frame frequency of 25 images per second, this means four flashes per image, so that the light output is raised. Since this is not desired, the value of the pulses can be reduced, which means that given parts of the discharge lamp, in this case the sealed-in current supply strips, are loaded to a lesser extent and are thus subjected to less wear. In one embodiment of the invention the control signals for the pulse rectifiers are derived in phase opposition from a generator having a frequency which is a multiple of the frame frequency. However, this involves the difficulty that with a control frequency of, for example 48 c./s. (twice the frame frequency of 24 images/sec.) and a supply frequency of 50 c./s., there are moments of interference between the two frequencies. Thus a number of much wider, unidentical pulses are produced, so that the discharge lamp is loaded to a greater extent, and a very troublesome flickering is produced.

In order to avoid this phenomenon the rectifying circuit is provided, in front of each pulse circuit, with a controlled gate rectifier, which is driven so that it is open when the pulse rectifier connected thereto is cut off, and conversely. It is thus ensured that at the instant of interference the supply of energy to the pulse capacitor is stopped.

In a particularly advantageous embodiment of the invention, each gate rectifier employs a control signal comprising the combination of a unilaterally rectified negative signal of a frequency equal to the frequency of the control sginal of the pulse rectifier, and a signal consisting of positive pulses of a frequency equal to double the frequency of the supply signal. The pulses thus receive an alternating negative bias voltage, so that the pulses become alternately positive and negative with respect to the negative grid voltage of the controlled pulse rectifiers. Owing to the frequency difference, said pulses shift along the negative alternating voltage, so that at the instant of interference, an exchange of the two groups of pulses is performed. As a result the gate rectifier becomes conductive half a period later and accordingly the associated pulse capacitor is charged at an instant which is correspondingly later.

The invention will be described more fully with reference to the drawing, in which.

Figure 1:
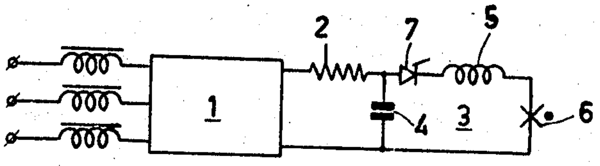
FIGURE 1 shows a known pulse circuit arrangement for a discharge lamp of a film projector.

FIGURE 1 shows a known pulse circuit arrangement comprising a three-phase supply circuit 1, which supplies a direct voltage with a ripple through a resistor 2 to the pulse circuit 3. This pulse circuit comprises a pulse capacitor 4 and an inductor 5 and it supplies pulses to a discharge lamp 6 through a controlled pulse rectifier 7, which may be a gas filled relay tube. The number of pulses or light flashes is equal to the value of the frequency of the control signal of the relay 7.

Figures 2, 3:
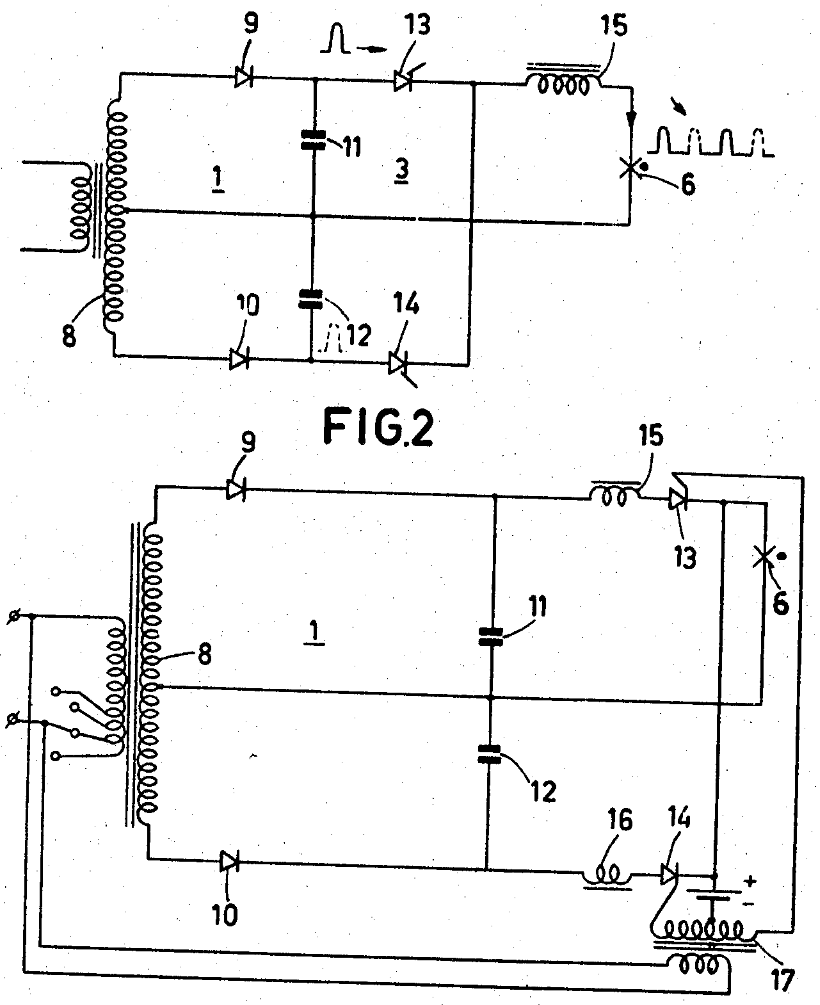
FIGURE 2 shows a pulse circuit with a supply portion according to the invention.
FIGURE 3 shows an embodiment of the invention.

FIGURE 2 shows an embodiment of the invention in which the supply circuit 1 consists of a supply transformer 8, which forms, with two rectifiers 9 and 10, a two-phase rectifier. The supply circuit 1 is connected to a multiple pulse circuit 3 comprising the pulse capacitors 11 and 12, the controlled rectifiers 13 and 14 and the common inductor 15. The pulse signals applied to the grids of the rectifier tubes have a relative phase shift of 180°. The discharge lamp 6 produces a number of light flashes per second equal to double the frequency of the control signal of the rectifier tubes.

Figure 4:
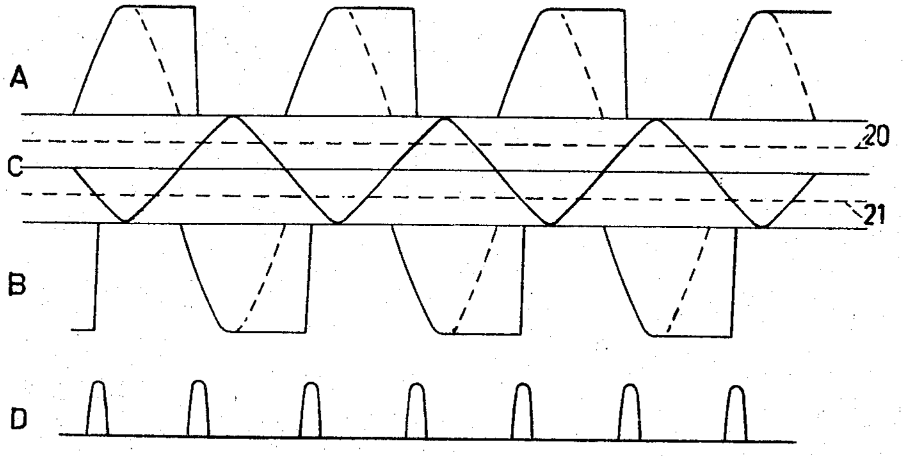
FIGURE 4 illustrates various voltage and current curves occurring in said embodiment.

As shown in FIGURE 3 each pulse circuit is provided with an inductor 15 and 16 and the control signals of the rectifier tubes 13 and 14 are derived through a transformer 17 from the supply lines. The operation of this arrangement is clarified in FIGURE 4 in which A and B designate the waveforms of the voltages across the pulse capacitors 11 and 12, respectively, and C denotes the control signal cooperating therewith, and applied to the grids of the rectifier tubes 13 and 14, respectively, whereas D designates the pulses received by the lamp 6. The broken line 20 represents the direct grid voltage of the rectifier tube 13 and the line 21 represents the direct grid voltage of the rectifier tube 14. It will be seen that each pulse capacitor is discharged when the control signal exceeds the direct grid voltage of the associated rectifier tube. During the discharge of a pulse capacitor one of the pulses D is produced.

Figure 5:
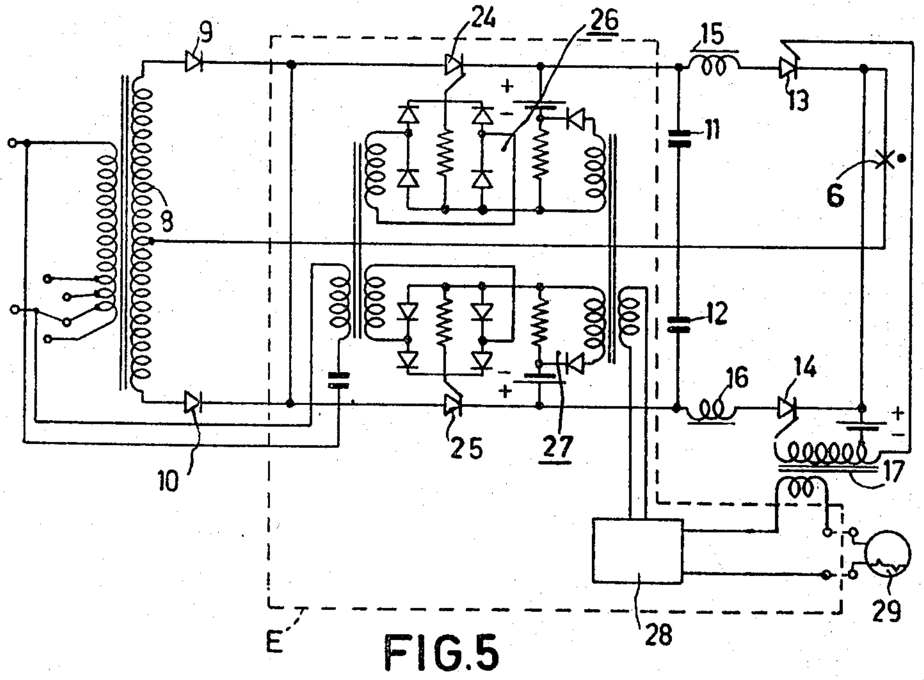
FIGURE 5 shows an embodiment of the invention comprising gate rectifiers.

FIGURE 5 shows a supply arrangement for a discharge lamp which is essentially identical to that of FIGURE 3, with the exception of the part circumscribed by the broken line E. This part comprises two gate rectifiers 24 and 25, the grids of which are connected to the control circuits 26 and 27, respectively. These control circuits are energized partly from the supply lines and partly through an amplifier 28 from a generator 29, which is in turn coupled with the Maltese cross of the projector, having a frequency of 48 c./s.

Figure 6:
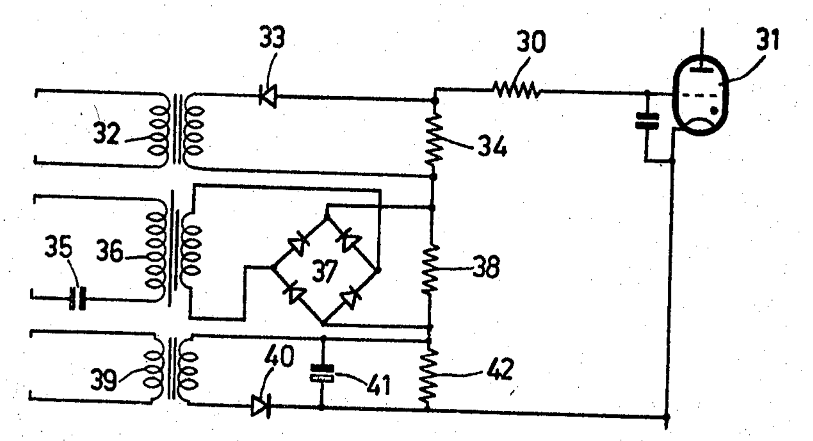
FIGURE 6 shows a control circuit for each gate rectifier of FIGURE 5.
Figure 7:
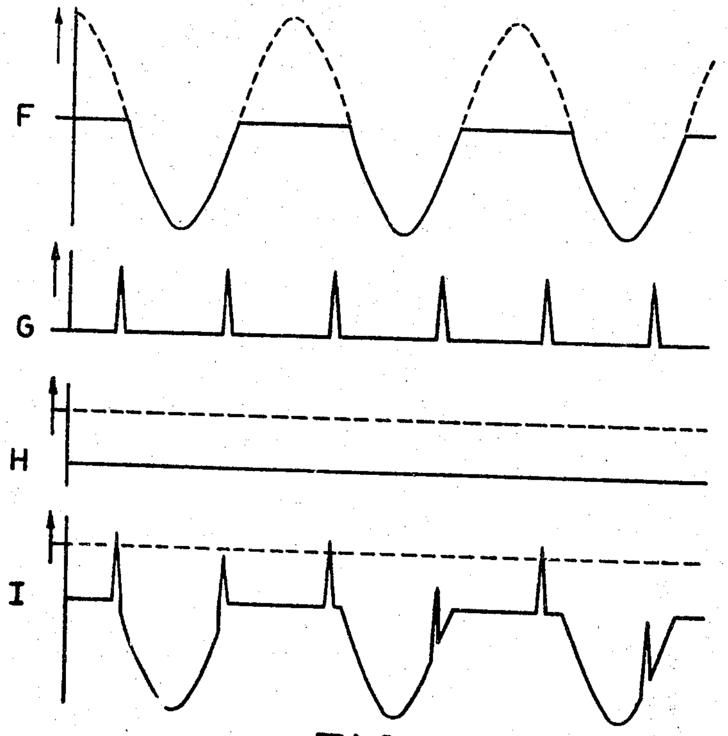
FIGURE 7 illustrates various curves of the current signals supplied by said control circuit to the gate rectifier.

FIGURE 6 shows the control circuits 26 and 27 for the associated gate rectifiers 24 and 25, respectively. The control circuit comprises three parts each providing a given signal. These signals are added and transmitted through a resistor 30 to the gate rectifier, a gas-filled rectifier tube 31. FIGURE 7 illustrates the various voltages supplied by the various parts of the control circuit and the over-all control signal. The transformer 32 is connected to an image generator having a frequency of 48 c./s. and through the rectifier 33, it supplies to the resistor 34 unilaterally rectified, negative, sinusoidal signals, which are represented by the curve F in FIGURE 7. The transformer 36 is connected through a capacitor 35 to the supply lines. The secondary winding of the transformer is included in a Graetz circuit 37, which applies to the resistor 38 a signal consisting of positive pulses having a frequency equal to double the supply frequency, for example, equal to 100 c./s. (curve G). The transformer 39 is also connected to the supply lines and supplies, through a rectifier 40 and a capacitor 41, a negative direct voltage to the resistor 42. This signal is represented in FIGURE 7 by the curve H. In FIGURE 7, curve I designates the waveform of the control signal consisting of the sum of the signals F, G and H. It will be apparent that the pulses G shift along the signal F.

Figure 8:
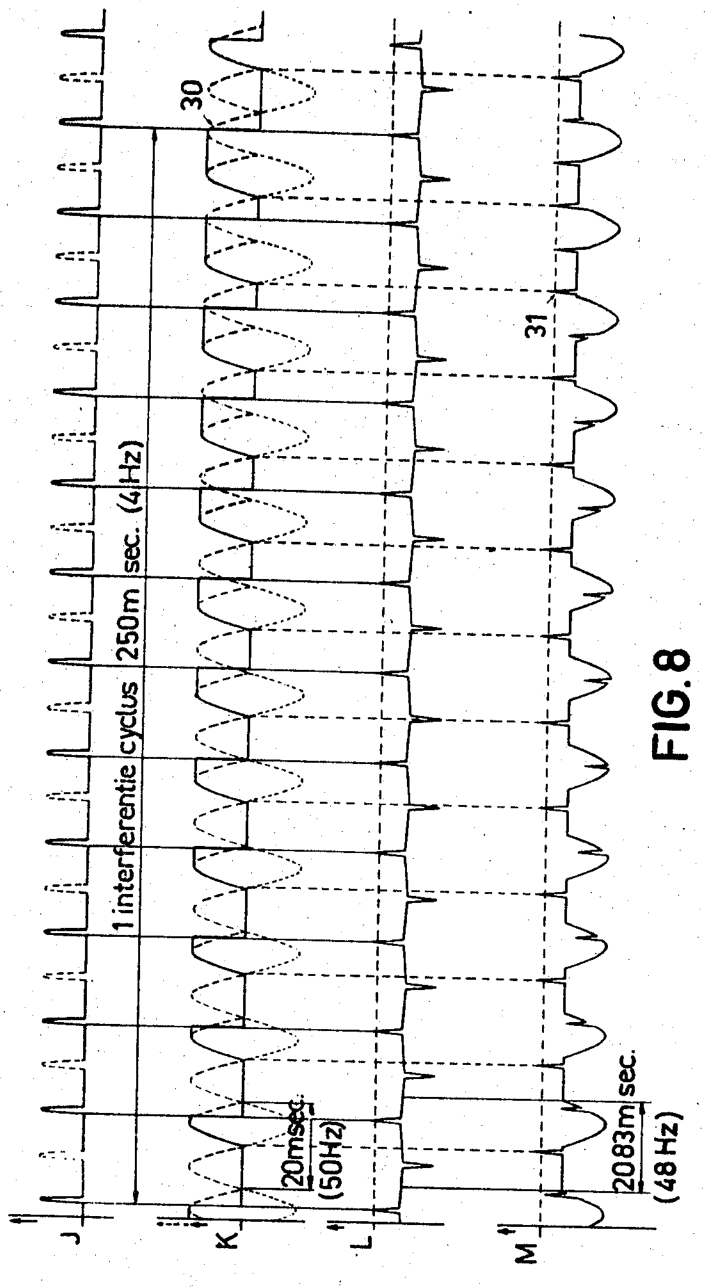
FIGURE 8 shows a complete survey of voltages and current curves of the embodiment of FIGURE 5.

FIGURE 8 shows four curves for various voltages and currents of the embodiment of FIGURE 5. Curve J designates the current pulses through the lamp, K designates the waveform of the charging voltage of the pulse capacitor, L the control signal of the associated pulse rectifier and M the control signal of the cooperating gate rectifier. All these curves cover an interference cycle of 250 msec.

This figure illustrates clearly that the pulse capacitor is charged sinusoidally and the starting instant depends upon the instant of opening of the gate rectifier, which means when the grid thereof receives a positive pulse.

When the pulse capacitor has reached its full charge, discharge will take place at the instant of opening of the pulse rectifier, i.e., when the control signal thereof exceeds the value of the adjusted grid voltage.

From the curve K it will be apparent that the last-mentioned instant gradually occurs later in the cycle as we proceed in the righthand direction of the curve.

A problem arises in that interference takes place between the supply frequency of 50 c./s. and the control signal frequency of 48 c./s. This occurs at the instant 30 (FIGURE 8). If the gate rectifier were not provided, the capacitor would be charged directly after the discharge at a time when the pulse rectifier is still conducting. The current would then pass directly to the discharge lamp so that a few very wide, irregular pulses would be produced.

By including the gate rectifier, this problem is avoided since the positive pulses shift to the left along the curve M representing the control signal of said tube. At the place 31 two positive pulses follow each other closely. This is, however, not troublesome, since this occurs during the charge of the pulse capacitor. An exchange of pulses is performed, so that the negative pulses replace the positive pulses, the latter occurring half a period later. The pulse capacitor is therefore charged one half period later. This results in a uniform pattern of periodic, identical pulses, represented by curve J.

What is claimed is:

1. A circuit for flashing a high pressure arc discharge lamp of the type having a pair of electrodes which define a current path therein, said circuit comprising a transformer having a primary winding connected to a source of AC voltage and a secondary winding, first and second diodes, first and second capacitors, first and second controlled rectifiers having control electrodes for initiating current flow therein, means connecting said first diode and said first capacitor in series across one half of said secondary winding so as to charge said first capacitor during one half cycle of said AC voltage, means connecting said second diode and said second capacitor in series across the other half of said secondary winding so as to charge said second capacitor during the opposite half cycle of said AC voltage, means connecting said first controlled rectifier and said lamp electrodes in a first series circuit across said first capacitor, means connecting said second controlled rectifier and said lamp electrodes in a second series circuit across said second capacitor, and means coupling the control electrodes of said first and second controlled rectifiers to said AC voltage in phase opposition thereby to alternately fire said first and second controlled rectifiers so as to discharge said capacitors across said lamp electrodes to pulse the lamp at a frequency which is twice the frequency of said AC voltage.

2. A circuit as described in claim 1 further comprising a source of DC bias voltage coupled to the control electrodes of said first and second controlled rectifiers of a magnitude and polarity to normally bias said controlled rectifiers off.

3. A circuit for flashing an arc discharge lamp at a first given frequency comprising, a source of alternating voltage of a second given frequency that is different than said first given frequency, electrical energy storage means, a first unidirectional conducting element having a control electrode, said first element having a conductive and a non-conductive state, means connecting said voltage source, said first unidirectional element and said energy storage means together in a closed circuit, means for applying a first control voltage of said second frequency to said control electrode thereby to trigger said first unidirectional element into said conductive state to transfer energy from said voltage source to said energy storage means during half cycles of one polarity of said alternating voltage, a second unidirectional conducting element having a control electrode, said second element having a conductive and a nonconductive state, circuit means interconnecting said energy storage means, said second unidirectional element and said lamp, and means for applying a second control voltage of said first frequency to the control electrode of said second unidirectional element to trigger same into said conductive state during periods in which said first unidirectional element is non-conductive, thereby to apply the stored energy of said energy storage means to said lamp to cause the lamp to flash.

4. A circuit as described in claim 3 wherein said first control voltage applying means further comprises means for producing a negative half-wave signal of said first frequency on which are superimposed positive pulses of a frequency which is twice the frequency of said alternating voltage source.

5. A circuit as described in claim 4 further comprising direct voltage biasing means coupled to said control electrodes for normally biasing said first and second unidirectional elements into the nonconductive state, and wherein said second control voltage applying means further comprises means for producing positive voltage pulses of said first frequency and of an amplitude sufficient to overcome the bias voltage at the control electrode of said second unidirectional element.

6. A circuit for flashing an arc discharge lamp comprising, a source of alternating voltage of a first given frequency, first and second capacitors, first and second unidirectional conducting gating means, means individually interconnecting said voltage source with said first and second capacitors by means of said first and second gating means, respectively, first means for selectively opening each of said first and second gating means at said first frequency so as to charge said capacitors during alternate half cycles of said alternating voltage, third and fourth unidirectional conducting gating means, means individually interconnecting said lamp with said first and second capacitors by means of said third and fourth gating means, respectively, and second means for selectively opening each of said third and fourth gating means at a second different frequency and in phase opposition thereby to alternately discharge said capacitors across said lamp to cause the lamp to flash at a frequency that is a multiple of said second frequency.

7. A circuit as described in claim 6 wherein said first, second, third and fourth gating means comprise first, second, third and fourth controlled rectifiers, respectively, each having a control electrode, each of said controlled rectifiers having a normally non-conductive state and a conductive state, said first selective opening means comprising means for supplying voltage pulses of said first frequency in phase opposition to the control electrodes of said first and second controlled rectifiers thereby to alternately trigger same into the conductive state to charge the respective first and second capacitors, said second selective opening means comprising means for supplying voltage pulses of said second frequency in phase opposition to the control electrodes of said third and fourth controlled rectifiers to alternately trigger same into the conductive state during periods in which said first and second controlled rectifiers, respectively, are in the non-conductive state.

8. A circuit as described in claim 6 wherein said first, second, third and fourth gating means comprise first, second, third and fourth controlled rectifiers, respectively, each having a control electrode, means coupled to the control electrodes of said first, second, third and fourth controlled rectifiers for normally biasing each of same into the nonconductive state, said first selective opening means comprising; means for producing a negative half-wave signal of said second frequency, means for producing positive voltage pulses of a frequency equal to twice the frequency of said alternating voltage source, and means for combining said negative half-wave signal and said positive voltage pulses and applying same to the control electrodes of said first and second controlled rectifiers, and said second selective opening means comprising means for supplying a control voltage of said second frequency to the control electrodes of said third and fourth controlled rectifiers in phase opposition.

9. A flash lamp circuit for a movie projector having a given frame frequency comprising, a high pressure arc discharge lamp, a source of alternating voltage of a first given frequency, first and second capacitors, first and second controlled rectifiers each having a control electrode, means connecting said first controlled rectifier and said first capacitor in a first series circuit across said voltage source so as to provide a charge path for said first capacitor during alternate half cycles of said alternating voltage, means connecting said second controlled rectifier and said second capacitor in a second series circuit across said voltage source so as to provide a charge path for said second capacitor during the opposite alternate half cycles of said alternating voltage, third and fourth controlled rectifiers each having a control electrode, means connecting said third controlled rectifier and said lamp in a third series circuit across said first capacitor to provide a discharge path for said first capacitor, means connecting said fourth controlled rectifier and said lamp in a fourth series circuit across said second capacitor to provide a discharge path for said second capacitor, each of said first, second, third and fourth controlled rectifiers being normally non-conductive, a first source of control voltage having a frequency that is a multiple of said frame frequency, means for applying said first control voltage to the control electrodes of said third and fourth controlled rectifiers in phase opposition to trigger same into conduction in mutually exclusive time intervals, a second source of control voltage having a different frequency than that of said first control voltage, and means for applying said second control voltage to the control electrodes of said first and second controlled rectifiers in phase opposition so as to trigger same into conduction during periods in which said third and fourth controlled rectifiers, respectively, are non-conductive.

10. A circuit as described in claim 9 wherein said second source of control voltage comprises means for producing a resultant signal which comprises the combination of negative half-wave voltage pulses of the same frequency as said first control voltage and of positive voltage pulses of a frequency which is twice the frequency of said alternating voltage source.

11. A circuit as described in claim 10 further comprising direct voltage biasing means coupled to the control electrodes of said first, second, third and fourth controlled rectifiers so as to normally bias each of same into the non-conductive state.

12. A circuit as described in claim 11 wherein said first and second sources of control voltage each include means coupled to said projector for receiving therefrom a signal voltage of said frequency that is a multiple of said frame frequency.

13. A circuit for flashing an arc discharge lamp comprising, a source of alternating voltage of a first given frequency, a second source of voltage of a second given frequency, a capacitor, first and second controlled rectifiers each having a control electrode, means connecting said first controlled rectifier and said capacitor in a first series circuit across said voltage source so as to provide a charge path for said capacitor during alternate half cycles of said alternating voltage, means connecting said second controlled rectifier and said lamp in a second series circuit across said capacitor to provide a discharge path therefor, each of said controlled rectifiers being normally non-conductive, a first transformer having a primary winding coupled to the output of said second voltage source and a secondary winding coupled to the control electrode of said second controlled rectifier to trigger same into conduction at said second frequency, a second transformer having a primary winding coupled to the output of said second voltage source and a secondary winding, a diode connected in series with said last named secondary winding to produce negative half-wave voltage pulses of said second frequency, a third transformer having a primary winding coupled to said source of alternating voltage and a secondary winding, a full-wave rectifier circuit connected to said last named secondary winding so as to produce positive voltage pulses of a frequency which is double the frequency of said alternating voltage, and means for adding said negative half-wave pulses and said positive pulses to produce a resultant control voltage which is applied to the control electrode of said first controlled rectifier to trigger same into conduction during periods in which said second controlled rectifier is non-conductive.

References Cited

UNITED STATES PATENTS

| | | | |
|---|---|---|---|
| 3,031,599 | 4/1962 | Paschke et al. | 315—241 |
| 3,127,540 | 3/1964 | Collins | 315—241 |
| 3,211,964 | 10/1965 | Thorne | 307—88.5/21.5 |

JOHN W. HUCKERT, *Primary Examiner.*

JERRY D. CRAIG, *Assistant Examiner.*

U.S. Cl. X.R.

215—241